J. B. & W. W. Hurlbut,
Making Staves.
Nº 28,986.        Patented July 3, 1860.
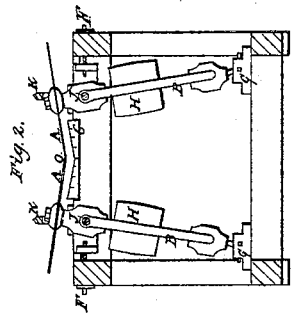
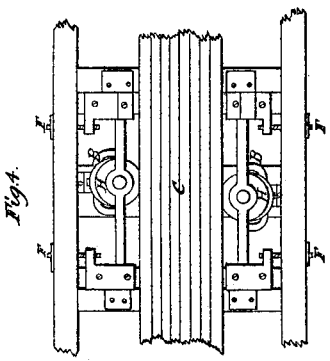
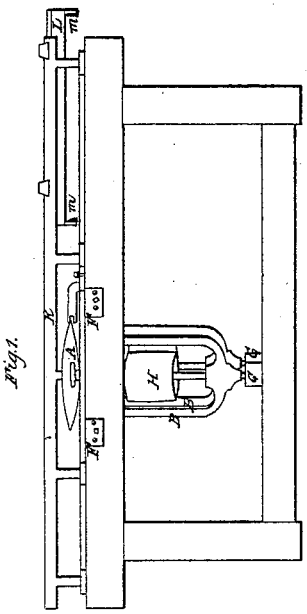
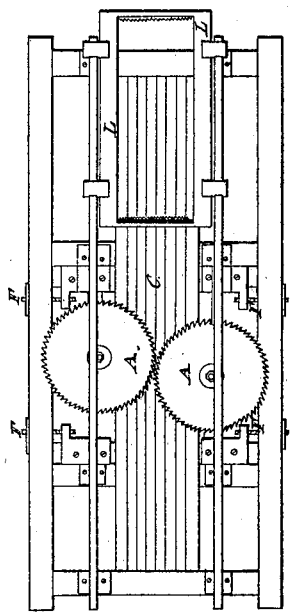
Witnesses.
Inventors.

UNITED STATES PATENT OFFICE.

WESTEL W. HURLBUT, OF MUSCATINE, IOWA, AND J. BURRELL HURLBUT, OF CHICAGO, ILLINOIS.

MACHINE FOR SAWING STAVES.

Specification of Letters Patent No. 28,986, dated July 3, 1860.

*To all whom it may concern:*

Be it known that we, WESTEL W. HURLBUT, of the city and county of Muscatine, in the State of Iowa, and J. BURRELL HURLBUT, of Chicago, in the county of Cook and State of Illinois, have invented a new and useful Machine for Sawing Staves for Barrels; and we do hereby declare that the following is a full, clear, and exact description of the construction and operation of the same, reference being had to the annexed drawings, making a part of this specification, in which—

Figure 1, is a side view. Fig. 2, is an end view, showing the position of the saws, &c. Fig. 3, is a ground plan, or view from above the machine. Fig. 4, is a sectional view of a portion of the machine.

Like letters refer to the same parts of the machine.

The operative parts of the machine are mounted upon a frame of wood or iron about seven feet in length, two and one half feet in width, and two and one half feet high.

A, in Figs. 1, 2, and 3, represents the saws as seen in the different views above mentioned. The mandrels to which the saws A, A, are attached are placed nearly upright or perpendicular as seen in Fig. 2, and are so arranged as to admit of being changed in their positions so as to make the angle between them at O, more or less obtuse as desired, by means of the screws F, F, in each of the Figs. 1, 2, 3, and 4, and by moving the lower ends of the mandrels, by means of the screws in the blocks G, G, as seen in Figs. 1, and 2. The mandrels pass downward through the iron yokes or frames B, B, as seen in Figs. 1, and 2. The frame B, for each mandrel and saw forms the bearing for the mandrel, and passing upward on each side of the pulley H, as in Figs. 1, 2, 3, connects with a bar as seen at I, I, in Fig. 2. The bar I, I, runs lengthwise of the frame and is attached at each end to the cross girts of the frame F, F in Fig. 1.

C, in Figs. 2, 3, and 4, represents the bed of the machine or gage upon which block lies, and may be raised or lowered to make the stave of any desired thickness. The end of the gage C, in Fig. 2, shows that it may be adjusted on any angle to correspond with that formed by the saws, A, A.

K, in Figs. 1, and 2, shows the ways or track upon which the carriage L, moves and by which it is guided.

The timber to be sawed is held by the dogs M, M, seen in Fig. 1, which are attached to the carriage L, the dogs M, M, taking hold of each extreme end of the block of timber.

A line drawn across the frame of the machine intersecting the center of the saws A, A, as in Fig. 3, represents that one of the saws A, must be placed forward of the other to admit of the periphery of each saw touching a line drawn lengthwise through the center of the machine, or in other words, each cutting to the center of the block, forming the angle of the stave as represented in Fig. 5.

An end view of the stave is shown by Fig. 5.

What we claim as new and as our invention in the above described machine and for which we desire to procure a patent, is as follows:

1. The arrangement of the saws and manner of adjusting them to any required angle to cut (a plane faced) stave for barrels of larger or smaller diameter.

2. The stave cut straight from each outer edge to the center forming any required angle, in the manner as above described or its equivalent.

WESTEL W. HURLBUT.
J. BURRELL HURLBUT.

In presence of—
HERNAN H. HARFF,
JACOB BUTLER,
HUGH J. CAMPBELL,
E. ADCOCK,
BENJ. T. MILLARD.